United States Patent
Shoji et al.

(10) Patent No.: US 6,826,234 B1
(45) Date of Patent: *Nov. 30, 2004

(54) RADIO COMMUNICATION APPARATUS AND RADIO COMMUNICATION METHOD

(75) Inventors: Yozo Shoji, Koganei (JP); Kiyoshi Hamaguchi, Koganei (JP); Hiroyo Ogawa, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 626 days.

This patent is subject to a terminal disclaimer.

(21) Appl. No.: 09/636,508

(22) Filed: Aug. 10, 2000

(30) Foreign Application Priority Data

Aug. 11, 1999 (JP) .......................................... 11-227508

(51) Int. Cl.[7] .............................................. H04L 27/00
(52) U.S. Cl. ..................................................... 375/259
(58) Field of Search ................................ 375/259, 377, 375/219, 295, 316

(56) References Cited

U.S. PATENT DOCUMENTS

| | | | | |
|---|---|---|---|---|
| 3,733,438 A | * | 5/1973 | Haley et al. ................. | 370/482 |
| 4,761,821 A | | 8/1988 | Mawhinney et al. | |
| 5,926,129 A | * | 7/1999 | Ephgrave et al. ........... | 342/200 |
| 5,943,372 A | * | 8/1999 | Gans et al. .................. | 375/347 |
| 6,590,944 B1 | * | 7/2003 | Kroeger ....................... | 375/340 |

FOREIGN PATENT DOCUMENTS

| | | |
|---|---|---|
| EP | 0 386 874 | 9/1990 |
| GB | 1 137 132 | 12/1968 |
| JP | 58-129854 | 8/1983 |
| JP | 1-235424 | 9/1989 |

* cited by examiner

Primary Examiner—Kevin Burd
(74) Attorney, Agent, or Firm—Oblon, Spivak, McClelland, Maier & Neustadt, P.C.

(57) ABSTRACT

In a radio communication apparatus and method, on the transmitting side, an input signal is modulated in an intermediate frequency band to produce a modulated intermediate frequency band signal, a local oscillation signal is used to up-convert the modulated intermediate frequency band signal to a modulated radio frequency band signal, and the local oscillation signal and the modulated radio frequency band signal are simultaneously transmitted as a radio signal, and, on the receiving side, the radio signal from the transmitter is received, the received signal is down-converted by multiplying the local oscillation signal component and the modulated radio frequency band signal component contained in the received signal to generate a multiplication component and thereby produce a modulated intermediate frequency band signal, and the modulated intermediate frequency band signal is demodulated.

5 Claims, 3 Drawing Sheets

RADIO COMMUNICATION APPARATUS AND RADIO COMMUNICATION METHOD

BACKGROUND OF THE INVENTION

1. Field of the Invention

This invention relates to a radio communication apparatus and a radio communication method.

2. Description of the Prior Art

In radio communication systems for high-quality transmission of broad-band digital signals and analog signals the SHF and higher frequency bands are used in light of the breadth of their dedicated bandwidths and the current deficiency of wavelengths in the microwave band. The radio communication systems come under consideration for use particularly in radio LANs, radio home links, radio video transmission systems, and radio car-to-station (or car-to-car) communications systems utilizing millimeter waves. In radio communication systems that use high radio frequency bands, the transmitter generally first generates a modulated signal and conducts multichannel multiplexing in an intermediate frequency band and then uses a local oscillation source to frequency-convert (up-convert) the resulting signal to the used radio frequency band. On the other hand, the receiver uses a local oscillation source to frequency-convert (down-convert) the received radio frequency band signal to the intermediate frequency band and then conducts channel extraction and signal demodulation.

The local oscillation sources used in both the receiver and transmitter must be in synchronism at this time. If the frequency difference or phase difference should fluctuate with time, the fluctuation will be superimposed on the modulated signal after down-conversion and degrade the quality of the demodulated signal. Both the transmitter and the receiver must therefore be equipped with local oscillation sources exhibiting extremely high frequency stability. Therefore, for realizing a local oscillator with high frequency stability, the practice has generally been to adopt a method utilizing a local oscillator stabilized by feedback control using a PLL (Phase Lock Loop) configuration and a method utilizing a synchronized carrier wave regenerative circuit of PLL configuration during signal demodulation.

However, the conventional radio communication systems have the following three problem points:

1) As the used radio frequency band becomes higher, it becomes impossible to realize a frequency-stable local oscillator and increasing local oscillator production cost makes the overall communication system expensive.
2) As the frequency fluctuation and phase noise arising in the local oscillator increase, it becomes difficult to realize synchronized carrier wave regeneration with a PLL configuration in the receiver circuit. Moreover, the receiver configuration becomes complex.
3) Phase noise contained in the local oscillation signals used in the transmitter and receiver degrades signal quality.

This invention was accomplished in light of the foregoing circumstances. An object of the invention is to provide a radio communication apparatus and a radio communication method that enable reduction of transmitter and receiver production cost, simplification of receiver configuration, and high-quality signal transmission.

SUMMARY OF THE INVENTION

For achieving this object, this invention provides a radio communication apparatus that down-converts a transmitted radio signal to an intermediate frequency band on a receiving side, which radio communication apparatus comprises a transmitter equipped with an intermediate frequency band modulator for modulating an input signal and outputting it as a modulated intermediate frequency band signal, a local oscillator for outputting an unmodulated carrier, a multiplier for multiplying the modulated intermediate frequency band signal and the unmodulated carrier and outputting a modulated radio frequency band signal, a combiner for combining the modulated radio frequency band signal from the multiplier and the unmodulated carrier output on a branch line from the local oscillator to produce a combined signal and outputting the combined signal, and a transmitting antenna for radio transmission of the combined signal; and a receiver equipped with a receiving antenna for receiving the combined signal from the transmitting antenna, a squarer for obtaining the modulated intermediate frequency band signal from the combined signal received by he receiving antenna, and an intermediate frequency band demodulator for demodulating the modulated intermediate frequency band signal from the squarer.

The invention further provides a radio communication method that down-converts a transmitted radio signal to an intermediate frequency band on a receiving side, which radio communication method comprises a first step of modulating an input signal in an intermediate frequency band to produce a modulated intermediate frequency band signal, using a local oscillation signal to up-convert the modulated intermediate frequency band signal to a modulated radio frequency band signal, and transmitting the local oscillation signal and the modulated radio frequency band signal simultaneously as a radio signal; and a second step of receiving the radio signal, down-converting the received signal by multiplying a component of the local oscillation signal and a component of the modulated radio frequency band signal contained in the received signal to generate a multiplication component and thereby produce a modulated intermediate frequency band signal, and demodulating the modulated intermediate frequency band signal.

In this radio communication method, the modulated radio frequency band signal and the local oscillation signal can be transmitted as orthtogonally polarized waves in the first step, and the modulated radio frequency band signal can be extracted from one and the local oscillation signal from the other of the received orthogonally polarized waves in the second step.

As explained in the foregoing, this invention is adapted so that on the transmitter side a modulated radio frequency band signal and a local oscillator signal are transmitted simultaneously and on the receiver side the transmitted local oscillator signal is used as the local synchronized oscillation. As a result, the receiver does not require a local oscillator. The receiver can therefore be structurally simplified and lowered in production cost.

Further, the local oscillation signal used for down-conversion in the receiver is the same as that used on the transmission side. The modulated IF band signal after down-conversion is therefore not susceptible to quality degradation by phase noise contained in the local oscillator of the transmitter. This makes high-quality signal transmission possible.

The above and other objects and features of the invention will become apparent from the following description made with reference to the drawings.

DESCRIPTION OF THE PREFERRED EMBODIMENTS

Figure 1:
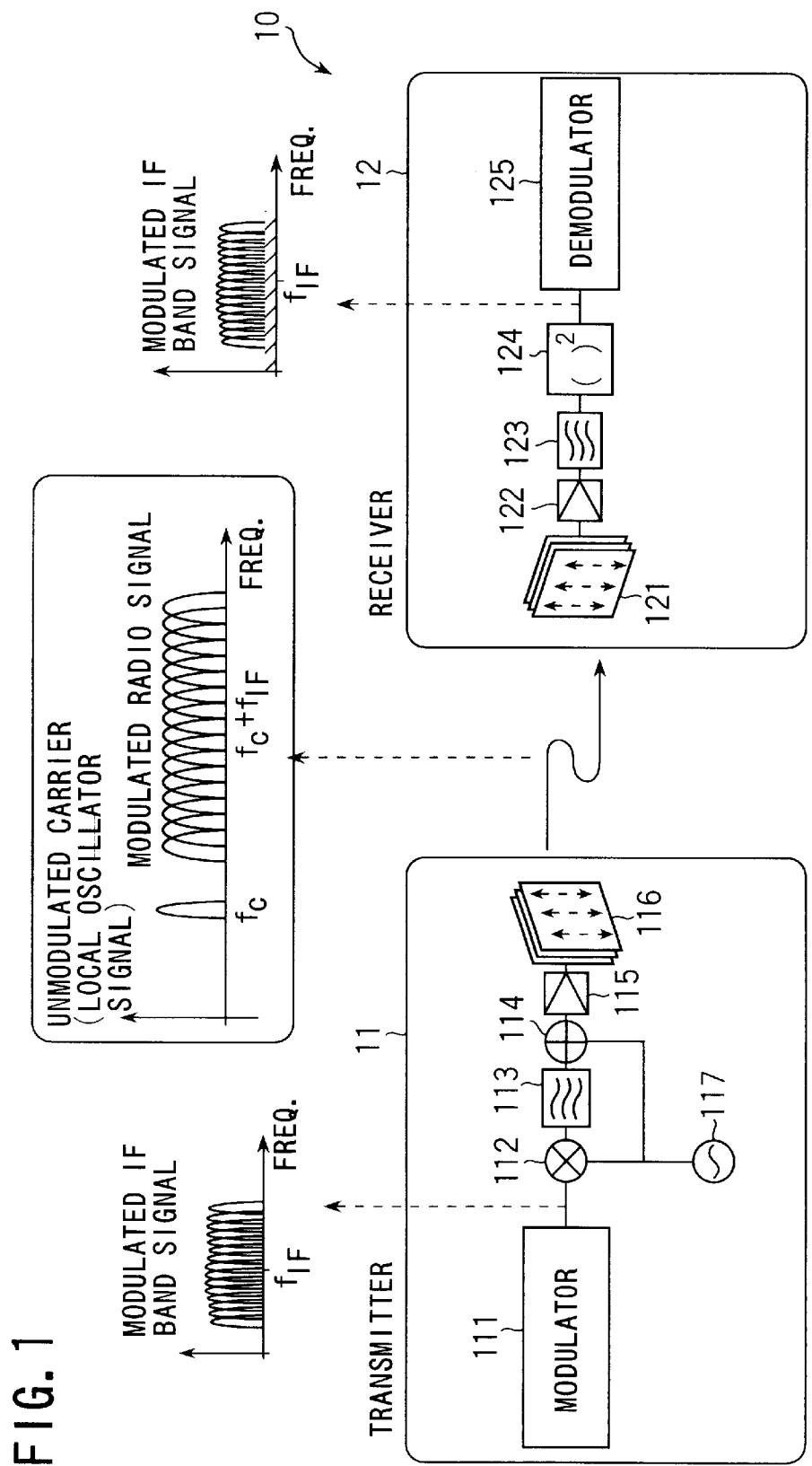
FIG. 1 is a schematic diagram of a radio communication apparatus that is a first embodiment of this invention.

FIG. 1 shows a radio communication apparatus 10 that is a first embodiment of this invention. The radio communication apparatus 10 is of the type that down-converts a transmitted radio signal to an intermediate frequency band on the receiving side. It is equipped with a transmitter 11 and a receiver 12.

The transmitter 11 comprises an intermediate frequency band modulator 111 for modulating an input signal and outputting it as a modulated intermediate frequency band signal (hereinafter called the "modulated IF band signal"), a local oscillator 117 for outputting a local oscillation signal (hereinafter called the "unmodulated carrier"), a multiplier 112 for multiplying the modulated IF band signal and the unmodulated carrier and outputting a modulated radio frequency band signal (hereinafter called the "modulated radio signal"), a combiner 114 for combining the modulated radio signal from the multiplier 112 and the unmodulated carrier output on a branch line from the local oscillator 117 and outputting the combined signal, and a transmitting antenna 116 for radio transmission of the combined signal.

A band-pass filter 113 is interposed between the multiplier 112 and the combiner 114 to remove unnecessary components included in the modulated radio signal from the multiplier 112. An amplifier 115 is interposed between the combiner 114 and the transmitting antenna 116 to amplify the combined signal from the combiner 114.

The receiver 12 comprises a receiving antenna 121 for receiving the combined signal from the transmitting antenna 116, a squarer 124 for obtaining the modulated IF band signal from the combined signal received by the receiving antenna 121, and an intermediate frequency band demodulator 125 for demodulating the modulated IF band signal from the squarer 124.

An amplifier 122 for amplifying the combined signal from the receiving antenna 121 and a band-pass filter 123 for removing unnecessary components included in combined signal from the amplifier 122 are interposed in series between the receiving antenna 121 and the squarer 124.

The spectral waveform of the modulated IF band signal (center frequency fIF) output by the intermediate frequency band modulator 111 of the transmitter 11 is shown at the upper left of FIG. 1. The spectral waveform of the combined signal in the spatial propagation path between the transmitting antenna 116 and the receiving antenna 121 is shown at the upper center of FIG. 1. The combined signal is composed of the unmodulated carrier (center frequency fc) and the modulated radio signal (center frequency fc+fIF) up-converted by the unmodulated carrier. The spectral waveform of the modulated IF band signal (center frequency fIF) output by the squarer 124 of the receiver 12 is shown at the upper right of FIG. 1.

Thus in this first embodiment, the unmodulated carrier used when up-converting the modulated IF band signal to the radio frequency band is radio-transmitted simultaneously with the modulated radio signal obtained by the up-conversion and, on the receiving side, the modulated radio signal is down-converted to the intermediate frequency band by generating the multiplication component of the unmodulated carrier component and modulated radio signal component of the received signal.

In other words, the transmitting side simultaneously transmits the modulated radio signal and the unmodulated carrier and the receiving side uses the unmodulated carrier as a local synchronized oscillation source when the received modulated radio signal is down-converted to the intermediate frequency band. The receiver 12 therefore does not require the receiver-side local oscillator that has conventionally required highly precise frequency stabilization. The receiver 12 can therefore be structurally simplified and lowered in production cost.

In addition, the cost of producing the local oscillator 117 used in the transmitter 11 the can be reduced because it is no longer required to have high frequency stability and excellent phase noise characteristics.

Moreover, the unmodulated carrier used for down-conversion in the receiver 12 is the same as that used on the transmission side and is synchronous therewith. The modulated IF band signal after down-conversion is therefore not susceptible to quality degradation by phase noise contained in the local oscillator 117 of the transmitter 11. This makes high-quality signal transmission possible.

In this embodiment, it is possible that signal quality may be degraded by occurrence of secondary intermodulation distortion caused by the quadratic term component of the modulated signal itself. However, such signal quality degradation can be adequately coped with either by making the frequency distance between the modulated radio signal and the unmodulated carrier greater than the modulated radio signal or by making the power distribution between the transmitted modulated radio signal and the unmodulated carrier large on the side of the unmodulated carrier.

Figure 2:
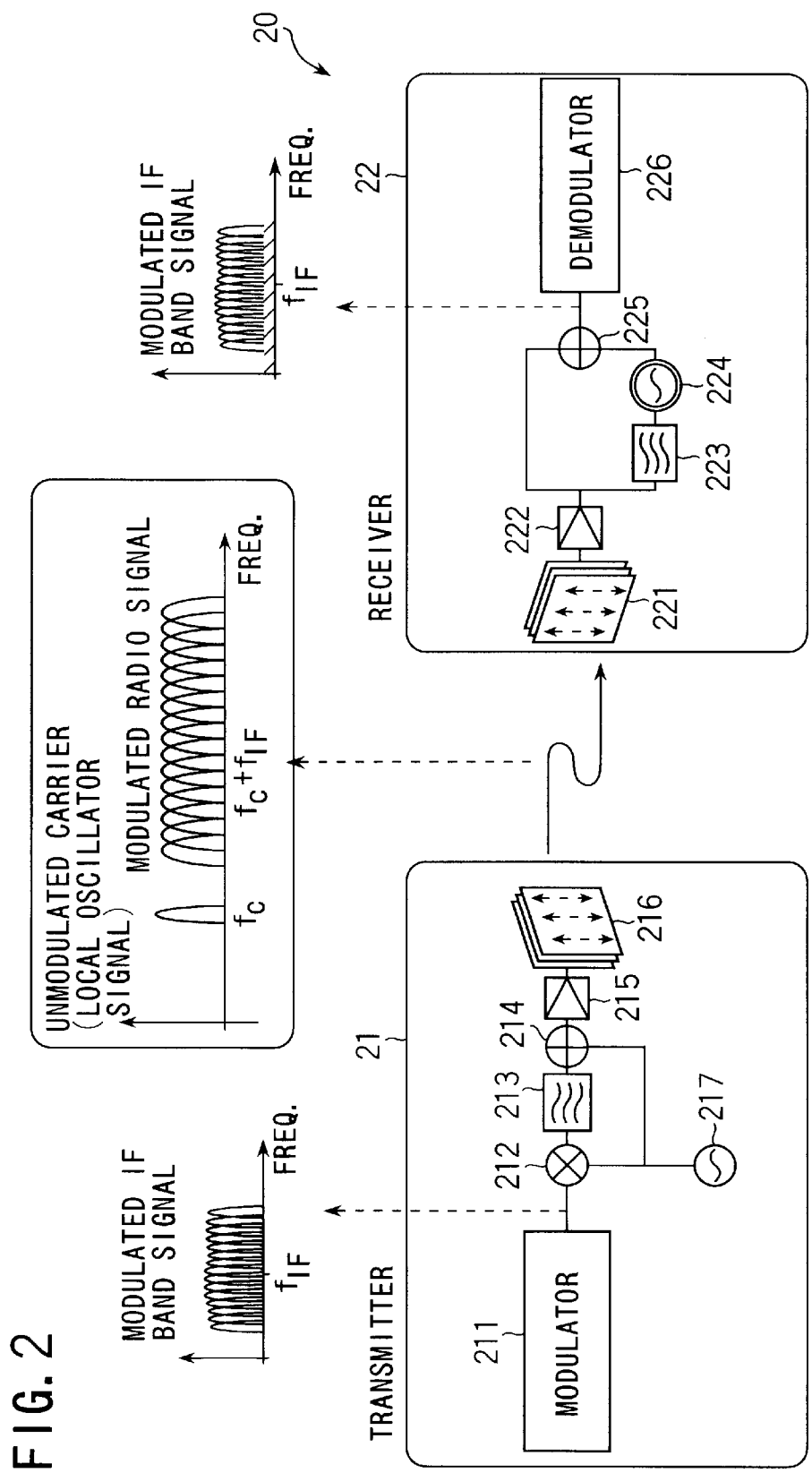
FIG. 2 is a schematic diagram of a radio communication apparatus that is a second embodiment of this invention.

FIG. 2 shows a radio communication apparatus 20 that is a second embodiment of this invention. The radio communication apparatus 20 of the second embodiment differs from that of the first embodiment in the configuration of its receiver 22. Its transmitter 21 has the same configuration as the transmitter 11 of the first embodiment and the constituent elements of the transmitter 21 are assigned similar reference numerals to the constituent elements of the transmitter 11 except that the initial "1" of the reference numerals in FIG. 1 are rewritten to "2" in FIG. 2. Explanation of the corresponding elements will not be repeated.

The receiver 22 comprises a receiving antenna 221 for receiving the combined signal from the transmitting antenna 216, an amplifier 222 for amplifying the combined signal received by the receiving antenna 221, a band-pass filter 223 for extracting the unmodulated carrier component from the combined signal amplified by the amplifier 222, an injection-locked oscillator 224 for regenerating the unmodulated carrier from the output of the band-pass filter 223, a multiplier for multiplying the modulated radio signal from the amplifier 222 and the unmodulated carrier from the injection-locked oscillator 224 to produce a modulated IF band signal, and an intermediate frequency band demodulator 226 for demodulating the modulated IF band signal from the multiplier.

An RF amplifier tuned for a single frequency band can be used in place of the injection-locked oscillator 224.

The spectral waveform of the modulated IF band signal (center frequency fIF) output by the intermediate frequency band modulator 211 of the transmitter 21 is shown at the upper left of FIG. 2. The spectral waveform of the combined signal in the spatial propagation path between the transmitting antenna 216 and the receiving antenna 221 is shown at the upper center of FIG. 2. The combined signal is composed of the unmodulated carrier (center frequency fc) and the modulated radio signal (center frequency fc+fIF) up-converted by the unmodulated carrier. The spectral waveform of the modulated IF band signal (center frequency fIF) output by the multiplier of the receiver 22 is shown at the upper right of FIG. 1.

The radio communication apparatus 20 of the foregoing configuration achieves the same effects as the radio communication apparatus 10 of the first embodiment. As explained earlier, the radio communication apparatus 20 of the first embodiment requires some measure for preventing signal degradation by secondary intermodulation distortion, for instance, requires the frequency distance between the modulated radio signal and the unmodulated carrier to be made greater than the modulated radio signal. No such preventive measure is necessary in this second embodiment, however, because the receiver 22 is provided with a branch for extracting and amplifying only the unmodulated carrier.

In addition, the regeneration of the unmodulated carrier with the injection-locked oscillator 224 makes it possible to produce a modulated IF band signal with an excellent noise characteristic.

Figure 3:
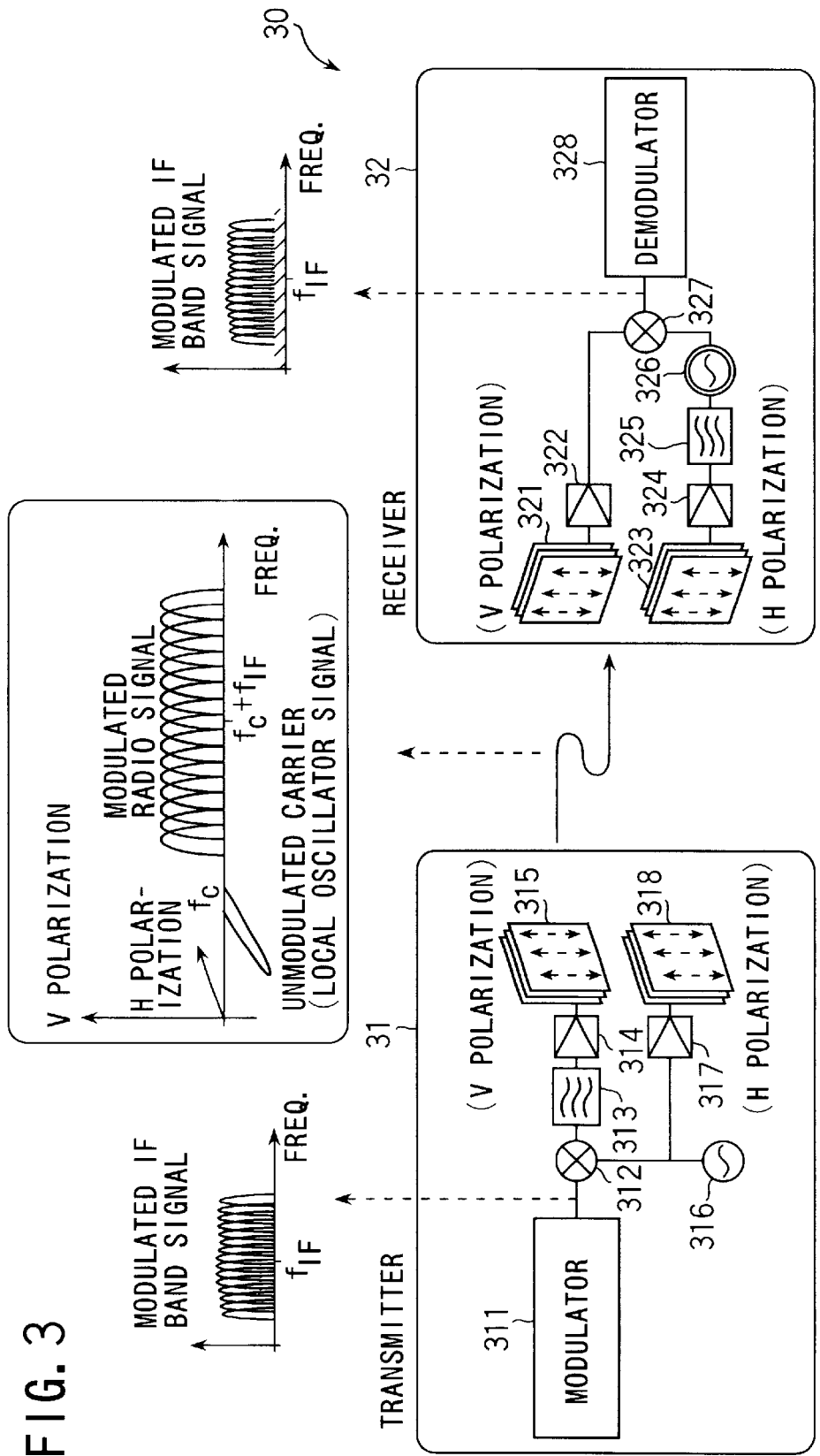
FIG. 3 is a schematic diagram of a radio communication apparatus that is a third embodiment of this invention.

FIG. 3 shows a radio communication apparatus 30 that is a third embodiment of this invention. The radio communication apparatus 30 comprises a transmitter 31 and a receiver 32. The transmitter 31 comprises an intermediate frequency band modulator 311 for modulating an input signal and outputting it as a modulated IF band signal, a local oscillator 316 for outputting an unmodulated carrier, a multiplier 312 for multiplying the modulated IF band signal and the unmodulated carrier and outputting a modulated radio signal, a first transmitting antenna 315 for polarizing the modulated radio signal from the multiplier 312 in one direction and radio-transmitting it as, for example, a V-polarized wave, and a second transmitting antenna 318 for polarizing the unmodulated carrier output on a branch line from the local oscillator 316 orthogonally to the one direction and radio-transmitting it as, for example, an H-polarized wave.

A band-pass filter 313 for removing unnecessary components included in the modulated radio signal from the multiplier 312 and an amplifier 314 for amplifying the modulated radio signal from the band-pass filter 313 are interposed between the multiplier 312 and the first transmitting antenna 315.

The receiver 32 comprises a first receiving antenna 321 for receiving the modulated radio signal from the first transmitting antenna 315, a second receiving antenna 323 for receiving the unmodulated carrier from the second transmitting antenna 318, a multiplier 327 for multiplying the modulated radio signal from the first receiving antenna 321 and the unmodulated carrier from the second receiving antenna 323 to produce a modulated IF band signal, and an intermediate frequency band demodulator 328 for demodulating the modulated IF band signal from the multiplier 327.

An amplifier 322 is interposed between the first receiving antenna 321 and the multiplier 327 to amplify the V-polarized wave received by the first receiving antenna 321 before sending it to the multiplier 327. An amplifier 324, a band-pass filter 325 and an injection-locked oscillator 326 are interposed in series between the second receiving antenna 323 and the multiplier 327 to amplify the H-polarized wave received by the second receiving antenna 323, remove its unnecessary components, and regenerate the unmodulated carrier. The regenerated unmodulated carrier is then sent to the multiplier 327.

The spectral waveform of the modulated IF band signal (center frequency fIF) output by the intermediate frequency band modulator 311 of the transmitter 31 is shown at the upper left of FIG. 3. The spectral waveform of the combined signal in the spatial propagation path between the first and second transmitting antennas 315, 318 and the first and second receiving antennas 321, 323 is shown at the upper center of FIG. 3. The combined signal is composed of the unmodulated carrier (center frequency fc) in the form of an H-polarized wave and the modulated radio signal (center frequency fc+fIF) in the form of a V-polarized wave up-converted by the unmodulated carrier. The spectral waveform of the modulated IF band signal (center frequency fIF) output by the multiplier 327 of the receiver 32 is shown at the upper right of FIG. 3.

The radio communication apparatus 30 of the foregoing configuration achieves the same effects as the radio communication apparatus 10 of the first embodiment. Like the radio communication apparatus 20 of the second embodiment, it does not require any measure for preventing signal degradation caused by the squarer 124 of the first embodiment.

The receiver 22 of the second embodiment explained earlier uses the band-pass filter 223 to extract the unmodulated carrier. In relatively high frequency bands such as the 30–300 GHz band, however, it is hard to achieve a band-pass filter 223 with a band width sufficiently narrow to extract only the unmodulated carrier. In contrast, the receiver 32 of the third embodiment can extract the unmodulated carrier with a considerably high degree of separation. This is because the modulated radio signal and unmodulated carrier are separated beforehand in the transmitter 31, transmitted as separate polarized waves with orthogonal polarization planes, and received in such form by the receiver 32. A high quality modulated IF band signal can therefore be obtained.

The transmitter 31 and the receiver 32 of the third embodiment both use separate antennas for the two polarized waves. The invention is not limited to this configuration, however, and it is instead possible, for example, to equip the transmitter with a single transmitting antenna that combines the two orthogonally polarized signals while maintaining their polarized states and transmits the combined signal and equip the receiver with a single receiving antenna that separates the received combined signal into the two polarized components.

The spectral waveforms shown in FIGS. 1–3 are the spectral waveforms of the modulated signal in the case of using the orthogonal multicarrier modulation method. The present invention is, however, not dependent on the modulation method or the modulation band. The modulated signal can therefore be one obtained by any method of modulation or can be a multichannel signal obtained by bundling a plurality of channels of such modulated signals.

Being configured in the foregoing manner, this invention is adapted so that on the transmitter side a modulated radio frequency band signal and a local oscillator signal are transmitted simultaneously and on the receiver side the transmitted local oscillator signal is used as the local synchronized oscillation source during down-conversion. As a result, the receiver does not require the receiver-side local oscillator that has conventionally required highly precise frequency stabilization. The receiver can therefore be structurally simplified and lowered in production cost.

In addition, the cost of producing the local oscillator used in the transmitter can be reduced because it is no longer required to have high frequency stability and excellent phase noise characteristics.

Further, the local oscillation signal used for down-conversion in the receiver is the same as that used on the transmission side. The modulated IF band signal after down-conversion is therefore not susceptible to quality degradation by phase noise contained in the local oscillator of the transmitter. This makes high-quality signal transmission possible.

In one aspect of the invention, moreover, the transmitter side radio-transmits the modulated radio frequency band signal and the local oscillation signal as polarized waves with orthogonal polarization planes and, upon receiving the polarized waves, the receiver side extracts the modulated radio frequency band signal from one polarized wave and the local oscillation signal from the other polarized wave. Since the local oscillation signal can therefore be extracted with a considerably high degree of separation, a high quality modulated IF band signal can be obtained.

What is claimed is:

1. A radio communication apparatus that down-converts a transmitted radio signal to an intermediate frequency band on a receiving side, the radio communication apparatus comprising:

a transmitter equipped with an intermediate frequency band modulator for modulating an input signal and outputting it as a modulated intermediate frequency band signal, a local oscillator for outputting an unmodulated carrier, a multiplier for multiplying the modulated intermediate frequency band signal and the unmodulated carrier and outputting a modulated radio frequency band signal, a combiner for combining the modulated radio frequency band signal from the multiplier and the unmodulated carrier output on a branch line from the local oscillator to produce a combined signal and outputting the combined signal, and a transmitting antenna for radio transmission of the combined signal; and a receiver equipped with a receiving antenna for receiving the combined signal from the transmitting antenna, a squarer for obtaining the modulated intermediate frequency band signal from the combined signal received by the receiving antenna, and an intermediate frequency band demodulator for demodulating the modulated intermediate frequency band signal from the squarer.

2. A radio communication apparatus that down-converts a transmitted radio signal to an intermediate frequency band on a receiving side, the radio communication apparatus comprising:

a transmitter equipped with an intermediate frequency band modulator for modulating an input signal and outputting it as a modulated intermediate frequency band signal, a local oscillator for outputting an unmodulated carrier, a multiplier for multiplying the modulated intermediate frequency band signal and the unmodulated carrier and outputting a modulated radio frequency band signal, a combiner for combining the modulated radio frequency band signal from the multiplier and the unmodulated carrier output on a branch line from the local oscillator to produce a combined signal and outputting the combined signal, and a transmitting antenna for radio transmission of the combined signal; and a receiver equipped with a receiving antenna for receiving the combined signal from the transmitting antenna, a band-pass filter for extracting a component of the unmodulated carrier from the combined signal received by the receiving antenna, an injection-locked oscillator for regenerating the unmodulated carrier from an output of the band-pass filter, a multiplier for multiplying the modulated radio frequency band signal in the combined signal from the receiving antenna and the unmodulated carrier from the injection-locked oscillator to produce a modulated intermediate frequency band signal, and an intermediate frequency band demodulator for demodulating the modulated intermediate frequency band signal from the multiplier.

3. A radio communication apparatus that down-converts a transmitted radio signal to an intermediate frequency band on a receiving side, the radio communication apparatus comprising:

a transmitting equipped with an intermediate frequency band modulator for modulating an input signal and outputting it as a modulated intermediate frequency band signal, a local oscillator for outputting an unmodulated carrier, a multiplier for multiplying the modulated intermediate frequency band signal and the unmodulated carrier and outputting a modulated radio frequency band signal, a first transmitting antenna for polarizing the modulated radio frequency band signal from the multiplier in one direction and transmitting the polarized modulated radio frequency band signal, and a second transmitting antenna for polarizing the unmodulated carrier output on a branch line from the local oscillator orthogonally to the one direction and transmitting the polarized unmodulated carrier; and a receiver equipped with a first receiving antenna for receiving the polarized modulated radio frequency band signal from the first transmitting antenna, a second receiving antenna for receiving the polarized unmodulated carrier from the second transmitting antenna, a multiplier for multiplying the polarized modulated radio frequency band signal from the first receiving antenna and the polarized unmodulated carrier from the second receiving antenna to produce a modulated intermediate frequency band signal, and an intermediate frequency band demodulator for demodulating the modulated intermediate frequency band signal from the multiplier.

4. A radio communication method that down-converts a transmitted radio signal to an intermediate frequency band on a receiving side, the radio communication method comprising the steps of:

modulating an input signal in an intermediate frequency band to produce a modulated intermediate frequency band signal to a modulated radio frequency band signal;

using a local oscillation signal on a transmitting side to up-convert the modulated intermediate frequency band signal to a modulated radio frequency band signal;

transmitting the local oscillation signal and the modulated radio frequency band signal simultaneously from the transmitting side as a radio signal; and receiving the radio signal at the receiving side;

down-converting the received signal by multiplying a component of the local oscillation signal that has been used for up-conversation on the transmitting side and transmitted to the receiving side and a component of the modulated radio frequency band signal contained in the received signal to generate a multiplication component and thereby produce a modulated intermediate frequency band signal; and demodulating the modulated intermediate frequency band signal.

5. A radio communication method according to claim 4, wherein the modulated radio frequency band signal and the local oscillation signal are transmitted as orthogonally polarized waves and the modulated radio frequency band signal is extracted from one and the local oscillation signal from the other of the received orthogonally polarized waves in the receiving step.

* * * * *